(No Model.)
C. MEGOW & J. L. MARKEL.
UNDERSHOT FEATHERING WATER WHEEL.
No. 268,705. Patented Dec. 5, 1882.
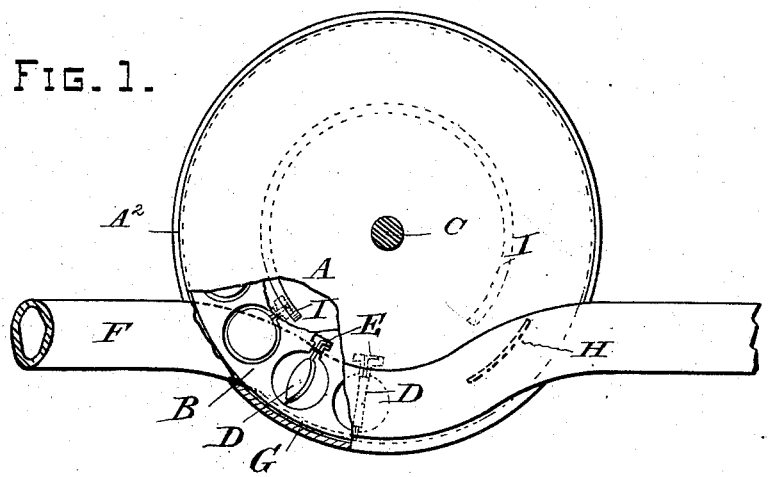
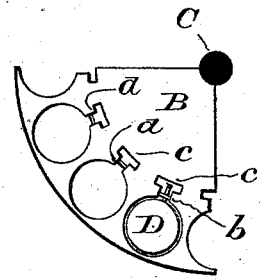
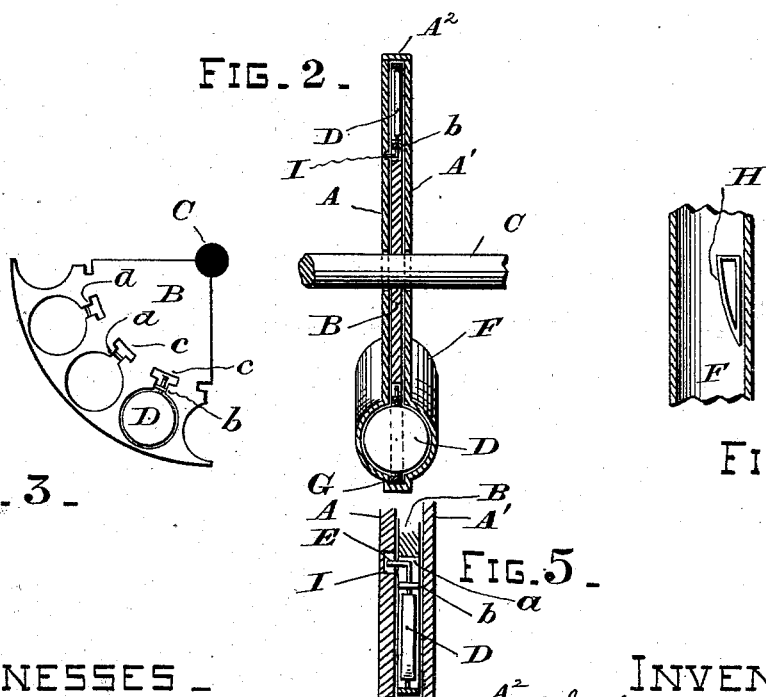
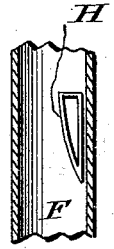
WITNESSES
Wilmer Bradford
George Derby
INVENTOR
Charles Megow
John Luis Markel
By C. W. M. Smith
Attorney.

UNITED STATES PATENT OFFICE.

CHARLES MEGOW AND JOHN L. MARKEL, OF SAN FRANCISCO, CAL.

UNDERSHOT FEATHERING WATER-WHEEL.

SPECIFICATION forming part of Letters Patent No. 268,705, dated December 5, 1882.

Application filed April 25, 1882. (No model.)

*To all whom it may concern:*

Be it known that we, CHARLES MEGOW and JOHN LUIS MARKEL, residing at San Francisco, in the county of San Francisco and State of California, have invented a certain new and useful Undershot Feathering Water-Wheel, of which the following is a specification.

The objects of our invention are to provide a water-wheel having a minimum of friction in its parts, and one which will require but a small modicum of power to operate. We accomplish these objects by the mechanism illustrated in the accompanying drawings, in which—

Figure 1 is a front elevation of our improved water-wheel with the casing and conduit partly broken away. Fig. 2 is a central vertical cross-section. Fig. 3 is a plan view, showing a portion of the wheel or disk. Fig. 4 is a sectional plan view, showing the feather or turning-rib. Fig. 6 is a detail view.

Similar letters refer to similar parts throughout the several views.

The drum or shell in which our water-wheel operates is formed of two disks, A A', connected at their edges by a rim, A², so as to form a narrow chamber, within which the wheel revolves. Within the shell or case is placed the peculiarly-constructed wheel B, keyed upon the axle or shaft C, which extends through and has bearings in both sides of the shell. Within circular apertures or perforations formed at or near the periphery of the disk or wheel we pivot at the top and bottom, and upon a radial line extending from the center to the circumference of the said wheel B, the movable floats or buckets D. The outer end of the pivot upon which the floats turn is stepped in the web or rim of the disk, while the inner end is carried up through a radial slot, *a*, extending inwardly from the aperture within which the float is placed, and having a transverse strip, *b*, in which the pivot or axle of the float is journaled. The upper end of this axle is bent over at right angles to the length of the axle, so as to form a finger, E, which is projected or extended in a direction parallel with the transverse axis of the float D. The wheel and shell or case is set in a curved pipe, tube, or conduit, F, through the upper side of which is made a slot for that purpose. The case simply forms a close connection with the upper surface of the curved pipe, so as to communicate therewith, while the disk or wheel B extends within said pipe, and its rim or periphery travels in a longitudinal groove, G, made in the lower face of the curved pipe F, the inner diameter of which is about equal to the diameter of the float D. A feather or curved spline, H, is attached to one side of the upper or discharge end of the curved tube, while upon the opposite side of the casing or shell A is formed a curved slot, I, which commences at a point nearly opposite the upper end of the feather H, and extends around the shell or casing to the point of connection between said casing and the curved tube, at which point it gradually decreases in depth or " dies out."

The operation of our improved water-wheel will be as follows, to wit: As water is admitted to and flows through the curved pipe F it is brought into contact with and impinges upon one side of the floats D, pressing them onward and producing a revolution of the wheel B, shaft C, and connected mechanism. As the floats D approach the upper end of the pipe F they successively impinge upon the feather H, and are gradually turned flatwise, and by the time they have left the bore of the pipe are turned completely within the side faces, lines, or walls of the wheel B, and do not rasp or scrape against the inner sides of the casing within which the wheel revolves. As the float is being turned flatwise or feathered within its carrying-wheel the finger E, which up to this time has been lying within an enlargement, *c*, formed at the head of slot *a*, as shown in Fig. 3, is turned outward, and, projecting at right angles from the face of the wheel, enters the head of the slot I, as shown in Figs. 4 and 5, and travels therein until the wheel has made a partial revolution and the float is about to again enter the pipe F, when the lessening depth of said groove will cause the finger to come in contact with the wall of the casing, and thus be moved or rotated back to its original position, thereby turning the buckets or floats broadside to the current flowing through the pipe, when the operation hereinbefore described is again repeated, each float in the wheel being successively turned flatwise to the current when entering the curved tube, and then turned edgewise when about to enter the casing or box A.

By having the casing fit snugly upon the wheel B no appreciable amount of water can enter said casing, and the whole head or volume of water will be employed directly upon and against the floats, and therefore no wastage or back-water is had.

Having thus described our invention, what we claim, and desire to secure by Letters Patent, is—

1. The combination, with a shallow internally-grooved casing and a curved pipe, tube, or conduit communicating therewith, of a water-wheel inclosed in said case and conduit, and provided at or near its periphery with rotatable floats, and means, substantially as described, for turning each float flatwise to the current when entering the conduit and edgewise when about to enter the shallow casing, substantially as set forth.

2. The combination of a shallow casing composed of the disks A A' and rim $A^2$, one of said disks being provided internally with a curved slot or groove, I, the curved tube F, communicating with said casing, and having groove G and feather H, the perforated wheel or disk B, inclosed within the casing and provided with shaft C, and the rotatable floats D, journaled in the perforations formed in the wheel and provided with fingers E, all substantially as and for the purpose described.

In testimony that we claim the foregoing we have hereunto set our hands and seals this 7th day of April, 1882.

CHARLES MEGOW. [L. S.]
JOHN LUIS MARKEL. [L. S.]

Witnesses:
C. W. M. SMITH,
CHAS. E. KELLY.